United States Patent [19]

McMurtrey

[11] Patent Number: 4,916,970
[45] Date of Patent: Apr. 17, 1990

[54] BICYCLE HANDLEBARD STEM

[75] Inventor: David K. McMurtrey, Maysville, Ky.

[73] Assignee: Wald Manufacturing Co., Inc., Maysville, Ky.

[21] Appl. No.: 369,722

[22] Filed: Jun. 22, 1989

[51] Int. Cl.⁴ .............................................. B62K 21/12
[52] U.S. Cl. ................................... 74/555.1; 280/279;
403/191; 403/367; 403/271; 228/173.6; 74/551.6
[58] Field of Search ................. 74/551.1, 551.3–551.7; 280/279, 280; 403/191, 209, 344, 367, 233, 271; 228/173.6

[56] References Cited

U.S. PATENT DOCUMENTS

| | | | |
|---|---|---|---|
| 2,487,661 | 11/1949 | McCauley | 74/551.6 X |
| 3,361,455 | 1/1968 | Hussey et al. | 74/551.6 X |
| 3,385,615 | 5/1968 | Hussey | 74/551.6 X |
| 3,722,930 | 3/1973 | Humlong | 74/551.6 X |
| 4,043,688 | 8/1977 | Humlong | 74/551.1 |
| 4,113,395 | 9/1978 | Pawsat et al. | 280/279 |
| 4,501,435 | 2/1985 | McMurtrey | 74/551.1 X |
| 4,537,525 | 8/1985 | McMurtrey | 403/191 |
| 4,601,483 | 7/1986 | McMurtrey | 280/279 |
| 4,676,120 | 6/1987 | Borromeo | 280/280 X |

FOREIGN PATENT DOCUMENTS

| | | | |
|---|---|---|---|
| 0437645 | 1/1975 | U.S.S.R. | 74/551.1 |
| 0713755 | 2/1980 | U.S.S.R. | 280/279 |
| 474652 | 11/1937 | United Kingdom | 280/279 |
| 664885 | 1/1952 | United Kingdom | 74/551.1 |

Primary Examiner—Vinh T. Luong
Attorney, Agent, or Firm—Wood, Herron & Evans

[57] ABSTRACT

A stem assembly for securing the handlebars of a bicycle to the frame of the bicycle, which stem comprises a barrel and a head, the head being formed from a sheet metal stamping comprising a neck section and a handlebar clamping section. The neck section of the head is of generally annular cross-sectional configuration and is characterized by a longitudinal seam extending for the length of the neck. The seam of the neck section of the head is welded along the seam so as to impart to the stem resistance to torsional failure of the neck.

7 Claims, 1 Drawing Sheet

U.S. Patent    Apr. 17, 1990    4,916,970
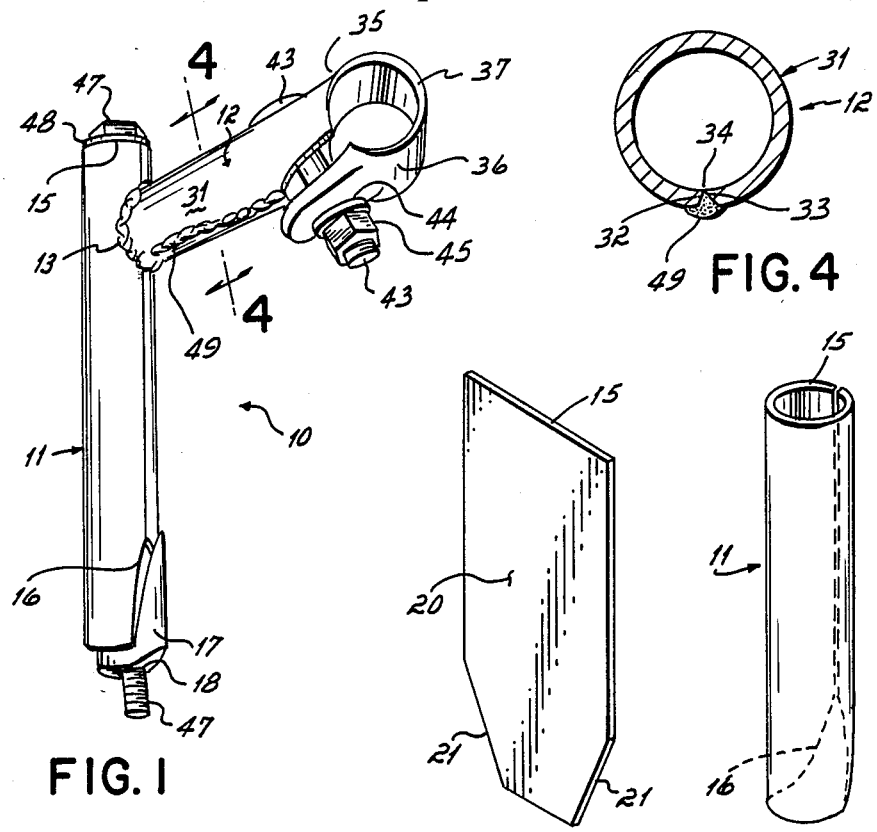
FIG. 1
FIG. 3A
FIG. 3B
FIG. 4
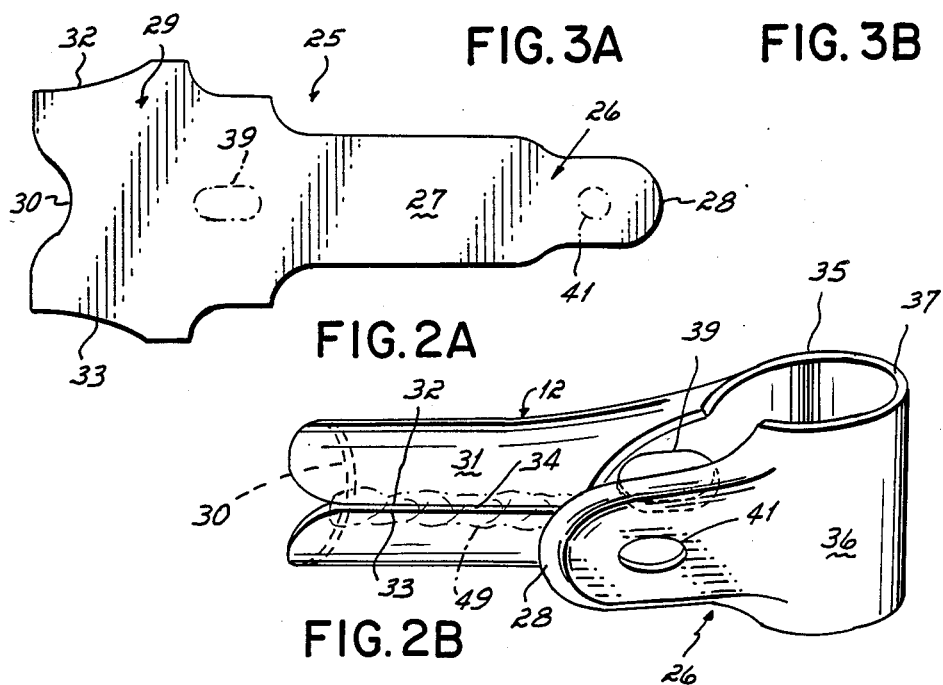
FIG. 2A
FIG. 2B

BICYCLE HANDLEBARD STEM

This invention relates generally to bicycles and, more particularly, to a stem for interconnecting the handlebars of a bicycle to the front fork of the bicycle.

There are a variety of bicycle handlebar stems for securing the handlebars of a bicycle to the front fork of the bicycle frame. Such stems, often termed "stem assemblies," generally consist of a tubular barrel which connects to the front wheel fork of the bicycle frame and a head which is adapted to receive and clamp the bicycle handlebars. These stem assemblies generally are made either as a single-piece, unitary item or as a two-piece item with the two pieces being welded together. More recently, a few of these stem assemblies have been made in three pieces.

If made in two pieces, one piece is a tubular barrel and the other piece is a clamping head which is welded or brazed to the barrel. One example of such a two-piece stem is disclosed in U.S. Pat. No. 4,501,435 assigned to the assignee of this application.

There recently has been developed a market for a bicycle stem which is characterized by a conventional tubular barrel, but with a relatively long, tubular neck terminating in a handlebar clamp. This style of stem is predominantly used with bicycles which have wide tires and handlebars with little or no vertical drop, i.e., the two handles are more or less in line with the center portion of the handlebar onto which the stem is tightened. This long-necked handlebar stem has generally been made in three pieces, the three pieces consisting of a tubular barrel, a long tubular neck, both of which are made from welded steel tubing, and a stamped metal handlebar clamp. The two tubular components of this three-piece stem are welded together after numerous secondary operations and similarly, the handlebar clamp is welded to the neck after a number of secondary operations. As a consequence of these numerous secondary operations and the requirement for two contouring welds, these three-piece handlebar stems are relatively expensive to manufacture.

It has been one objective of this invention to provide an improved bicycle handlebar stem which is characterized by a long tubular neck connected to the barrel of the stem and which is less expensive to manufacture than prior art bicycle stems of this same character.

Still another objective of this invention has been to reduce the cost of a bicycle stem of the type which is characterized by a long, tubular neck angled relative to the tubular barrel.

When a bicycle handlebar stem is utilized to secure handlebars having little or no vertical drop to the front fork of a bicycle frame, the bicycle rider does not apply much torque to the handlebar which would cause the handlebar to rotate within the handlebar clamping portion of the stem, but that rider does apply to the handlebars a very substantial torsional load which is transmitted to the stem in such a way as to apply twisting force to the neck of the stem. In other words, that torsional load on the neck of the stem tends to rotate the neck of the stem in the same way that torsional load is applied to the tubular drive shaft of an automobile.

In accordance with the invention of this application, a long-necked handlebar stem is manufactured with the neck and the clamping portion of the stem stamped and formed from a single sheet metal stamping. When so manufactured, the circular cross section neck is characterized by a longitudinally extending seam along the length of the neck. In the preferred embodiment, this seam is located along the bottom of the neck.

It has been found that when a long-necked bicycle stem having a neck and clamping head manufactured from a single sheet metal stamping is utilized with a handlebar having little or no vertical drop, the stem is prone to fail because of the high torsional stresses applied to the neck of the stem. In the practice of this invention, though, these high torsional stresses to the neck of the stem have been found to be within acceptable limits if the longitudinal seam of the neck portion of the stem is welded. By providing a weld along the seam, it has been found that the life of the stem in a fatigue test is well within an acceptable range. The same identical stem made without the weld along the seam is not acceptable.

SUMMARY OF THE INVENTION

In accordance with the practice of this invention, the handlebar stem of this invention comprises a tubular barrel having a longitudinal axis and a head formed from sheet metal, which head has an elongated tubular neck section and a generally annular handlebar clamp section formed on one end of the tubular neck section, the opposite end of the neck section being secured to the side of the barrel by a generally annular contoured weld at a location spaced downwardly from the top end of the barrel. The neck section of the stem is formed into a generally annular cross-sectional configuration with a longitudinally extending seam along one side of the neck, which longitudinally extending seam is welded so as to impart resistance to torsional failure of the elongated tubular neck section of the stem.

These and other objects of this invention will be more readily apparent from the following description of the drawings in which:

FIG. 1 is a perspective view of one preferred embodiment of the stem of this invention.

FIG. 2A is a top plan view of the sheet metal head section in a flat condition illustrating the shape of the flat sheet metal stamping required to form the completed head.

FIG. 2B is a perspective view of the completed formed head formed from the stamping of FIG. 2A.

FIG. 3A is a perspective view of the sheet metal tubular barrel in a flat condition illustrating the shape of the flat sheet metal stamping required to form the completed tubular barrel.

FIG. 3B is a perspective view of the completely formed barrel.

FIG. 4 is a cross-sectional view taken on line 4—4 of FIG. 1.

Referring first to FIG. 1, there is illustrated a bicycle stem assembly 10. This stem assembly includes a tubular barrel 11 connected to a head 12 by a contoured weld 13. The barrel 11 and head 12 are separate pieces made in different operations and then connected together in a welding operation at 13 form the completed stem 10.

The tubular barrel 11 is formed with a generally flat or planar upper end 15 and a lower chamfered end 16. The chamfered end 16 is adapted to receive a wedge nut 17 having a threaded central bore 18. This configuration of tubular barrel is, in the preferred embodiment, made from a flat sheet of sheet metal stock 20 formed into a tubular configuration by a conventional progressive die. As shown in FIGS. 3A and 3B, the sheet metal stock 20 is provided with tapered edges 21 at the lower end so that the chamfered end 16 is automatically formed when the sheet metal stock 20 is shaped into a tubular configuration. Alternatively, a section of welded tubing may be utilized to form the tubular barrel 11, in which event a separate machining operation is required to form the chamfered end 16.

The head 12 of the stem 10 is formed from a flat sheet metal stamping 25 in multiple-stage forming dies. As illustrated in FIGS. 2A and 2B, a tongue-shaped section 26 of stamping 25 is profiled to form the configuration illustrated in FIG. 2A. The tongue-shaped section 26 includes an elongated intermediate portion 27 disposed between a curved end section 28 and a greater width profiled end section 29. The endmost edge 30 of the wide end section 29 remote from the curved end section 28 is curved such that when the wide end section 29 is formed into a circular cross-sectional neck 31, the generally arcuate edge 30 forms a contoured edge which corresponds in shape and mates with the side of the barrel 11 preparatory to the welding of the edge 30 to the side of the barrel.

The completed head 12 is formed by bending the wide end section 29 into a circular configuration. In the course of bending the end section 29 into a generally circular cross section configuration, the side edges 32, 33 of the wide end section 29 are moved into juxtaposition to form a seam 34 on the underside of the neck. The intermediate portion 27 and curved end section 28 of the head 12 are bent into a generally U-shaped configuration with the curved end section 28 located beneath the neck section 29. Thus, the neck section 29 and curved end section 28 are formed into an upper half section 35 and a lower half section 36 located beneath the upper half section 35 and spaced therefrom. These profiling and bending operations may be accomplished in a progressive die or by any other suitable means. The upper and lower half sections 35, 36 of the head form an annular sleeve section 37 which is adapted to receive and clamp the handlebars of a bicycle. An upper oblong hole 39 is formed in the upper half section 35 of the neck section 29, and a lower round hole 41 is formed in the curved end section 28. The upper and lower holes 39, 41 align with one another when the head section is completely formed and are adapted to receive a bolt 43 passing therethrough which is secured by a washer 44 and nut 45. When the nut 45 is tightened onto the bolt 43, it is operable to urge the upper and lower halves 35, 36 together so that handlebars may be tightly clamped within the annular sleeve section 37.

The completed stem 10 of this invention is formed by connecting the head 12 to the tubular barrel 11. This is accomplished by placing the contoured edge 30 of the neck section 29 of the head over the side of the barrel 11. The contour of the edge 30 in the formed head 12 is such that it matches the contour of the side of the barrel 11. The edge 30 is then contour welded as at 13 to the side of the barrel so as to permanently affix the neck to the barrel. A bolt 47 is then inserted through a washer 48, which washer rests atop the tubular barrel 11. The bolt extends through the central bore of the barrel and is threaded into the wedge nut 17 at the base of the tubular barrel 11. The bolt acts to connect the stem assembly 10 to the wedge nut 17, and when the wedge nut 17 is tightened relative to the chamfered end 16 of the barrel, to secure the stem assembly within a front wheel fork (not shown) of a bicycle frame.

It is important to note that the seam 34 is welded as at 49 along its length. The weld 49 therefore extends from the barrel 11 longitudinally of the neck along the neck 31. It has been found that when this stem is utilized to connect a handlebar of a bicycle, and particularly a handlebar which has little or no drop, substantial torque is imparted to the neck section 31 of the head 12. This torque results from a bicycle rider placing his or her weight unevenly on one or the other of the bars and thereby imparting torsional stress to the neck section 31 of the handlebar. In torsional fatigue, the stem is subject to premature failure in the absence of the weld 49 on the seam 34. The presence of the weld 49 along the seam 34, though, has been found to impart substantially greater resistance to fatigue failure to the stem of this invention. A stem made with the welded seam, as compared to the same stem but without the weld 49, has been found to have a more than acceptable life when measured in terms of repeated loading and unloading of torsional forces applied to the stem.

While I have described only a single preferred embodiment of my invention, persons skilled in this art will appreciate changes and modifications which may be made without departing from the spirit of my invention. For example, the head is shown in the preferred embodiment as being angled up with respect to the barrel. It is contemplated that the head could be perpendicular to the barrel or even angled downwardly with respect to the barrel. Therefore, I do not intend to be limited except by the scope of the following appended claims:

I claim:

1. A stem assembly for securing the handlebars of a bicycle to a frame comprising:

a tubular barrel having a longitudinal axis, a top end and a side portion, a head formed from a first flat sheet of sheet metal, said head having an elongated tubular neck section and a generally annular handlebar clamp section formed on one end of said tubular neck section, the opposite end of said neck section being secured to said side portion of said barrel by a generally annular contoured weld at a location spaced downwardly from said top end of said barrel, said neck section of said head being formed into a generally annular cross-sectional configuration from a portion of said flat sheet metal, which portion has a pair of opposed side edges, said opposed side edges of said neck section abutting one another in said generally annular cross-sectional configuration of said neck section, and said abutting edges being welded together along said tubular neck section so as to impart resistance to torsional failure of said elongated tubular neck section of said stem assembly.

2. The stem assembly of claim 1 wherein said tubular barrel has a chamfer at the lower end thereof, said chamfer contacting a wedge nut for connection of said tubular barrel to said bicycle frame.

3. The stem assembly of claim 1 wherein said handlebar clamp section of said head is formed in a U-shape with an upper half section and a lower half section, said upper and lower half sections together forming a generally annular sleeve section, said sleeve section being adapted to receive and clamp handlebars therein, said upper and lower half sections being formed with aligned bores to receive fastening means, said fastening means being adapted to tighten said upper and lower half sections together for clamping said handlebars within said annular sleeve section.

4. The stem assembly of claim 1 wherein said tubular barrel includes a chamfer on one end engaging a tapered surface of a wedge nut, said wedge nut having a threaded central bore, said wedge nut being adapted to contact and clamp said stem to a bicycle fork, said barrel having a central bore, a bolt being inserted through said central bore of said tubular barrel and threaded within said central bore of said wedge nut.

5. The stem assembly of claim 4 wherein said tubular barrel is formed from a second of sheet metal having tapered sides at one end, said flat section being formed into a tube shape.

6. A stem assembly for securing the handlebars of a bicycle to a frame comprising:

a tubular barrel having a longitudinal axis, a top end and a side portion, a head formed from a flat sheet of sheet metal, said head having an elongated tubular neck section and a generally U-shaped handlebar clamp section formed on one end of said tubular neck section, the opposite end of said neck section being secured to said side portion of said barrel by a generally annular contoured weld at a location spaced downwardly from said top end of said barrel, said neck section having a longitudinal axis extending at an angle to said longitudinal axis of said barrel, said neck section having a longitudinally extending seam on one side thereof, said seam being formed by a pair of abutting side edges of the flat sheet of sheet metal from which said head section is formed, and said abutting side edges of said tubular neck section being welded together along said tubular neck section so as to impart resistance to torsional failure of said elongated tubular neck section of said stem assembly.

7. The stem assembly of claim 6 wherein said handlebar clamp section of said head is formed with an upper half section and a lower half section, said upper and lower half sections together forming a generally annular sleeve section, said sleeve section being adapted to receive and clamp handlebars therein, said upper and lower half sections being formed with aligned bores to receive fastening means, said fastening means being adapted to tighten said upper and lower half sections together for clamping handlebars within said annular sleeve section.

* * * * *

UNITED STATES PATENT AND TRADEMARK OFFICE
CERTIFICATE OF CORRECTION

PATENT NO. : 4,916,970

DATED : April 17, 1990

INVENTOR(S) : David K. McMurtrey

It is certified that error appears in the above-identified patent and that said Letters Patent is hereby corrected as shown below:

On the title page item [54] and in column 1, line 1, the title should read --BICYCLE HANDLEBAR STEM--.

Column 5, line 10, "second of" should read as --second flat sheet of--.

Signed and Sealed this

Thirtieth Day of June, 1992

Attest:

DOUGLAS B. COMER

*Attesting Officer*  *Acting Commissioner of Patents and Trademarks*